United States Patent [19]

Yang

[11] Patent Number: 4,697,790

[45] Date of Patent: Oct. 6, 1987

[54] PULLEY HOISTS

[76] Inventor: Tai-Her Yang, 5-1 Taipin St., Si-Hu Town, Dzan-Hwa, Taiwan

[21] Appl. No.: 800,285

[22] Filed: Nov. 21, 1985

[51] Int. Cl.[4] .......................... B66D 3/00; G01L 5/06

[52] U.S. Cl. .................................... 254/332; 116/212; 254/369; 254/376; 254/380; 294/86.18

[58] Field of Search ............... 254/223, 224, 237, 242, 254/268, 288, 329, 332, 369, 376, 380; 294/82.11, 86.18; 116/208, 212

[56] References Cited

U.S. PATENT DOCUMENTS

| | | | |
|---|---|---|---|
| 2,658,723 | 11/1953 | Coffing | 254/369 |
| 3,410,246 | 11/1968 | Lowe | 116/212 |
| 3,602,065 | 8/1971 | Ratcliff | 254/369 X |
| 4,278,043 | 7/1981 | Heath | 116/212 X |
| 4,457,251 | 7/1984 | Weman et al. | 116/212 |
| 4,462,570 | 7/1984 | Gagnet | 254/268 |

FOREIGN PATENT DOCUMENTS

| | | | |
|---|---|---|---|
| 1911962 | 9/1970 | Fed. Rep. of Germany | 254/268 |

*Primary Examiner*—Stuart S. Levy
*Assistant Examiner*—Joseph J. Hail III
*Attorney, Agent, or Firm*—Leonard Bloom

[57] ABSTRACT

Pulley hoists are disclosed which provide moving anchor hooks that are suspended by two "pulls" of rope, and which may be fabricated by a single part. Anchor hooks are also disclosed which have multiple, independently movable hook portions so that certain large objects may be moved using a sole power unit having said anchor hooks at either end thereof. The anchor hooks of the present invention are also provided with tension indicator apparatuses and safety apparatuses in the event of the overloading of the device. Safety apparatus and sound alarm apparatus are also provided on the power units of the pulley hoists of the present invention in the event of the overloading of the device.

1 Claim, 51 Drawing Figures

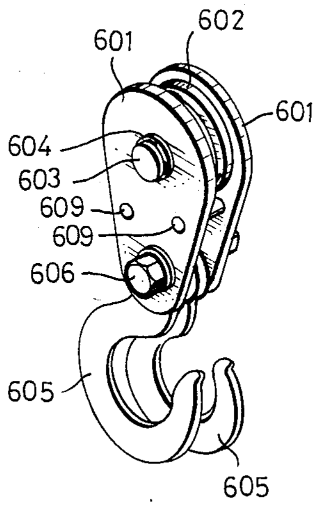
FIG. 23
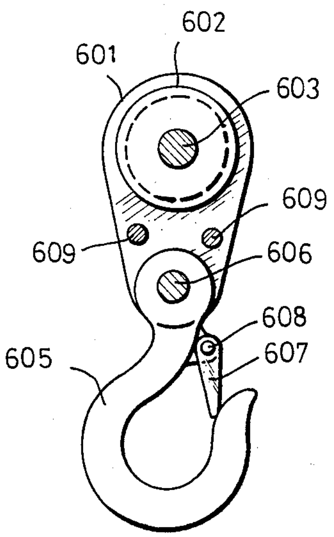
FIG. 24
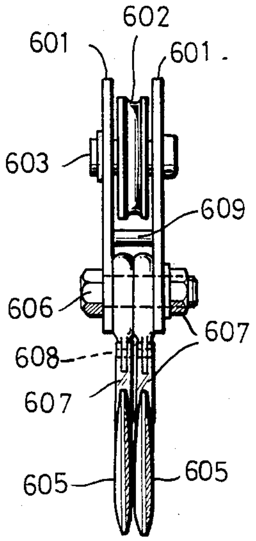
FIG. 25
FIG.29
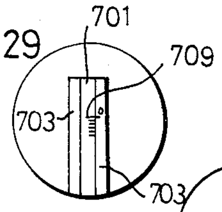
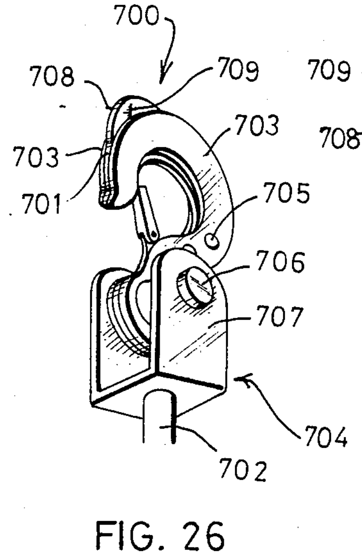
FIG. 26
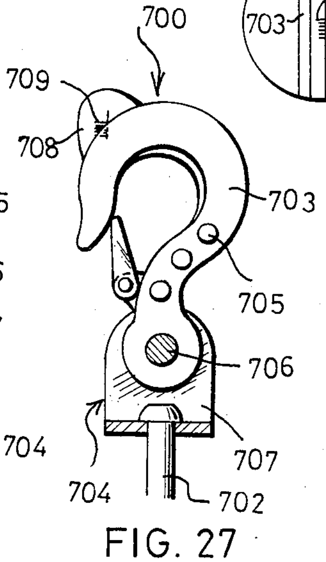
FIG. 27
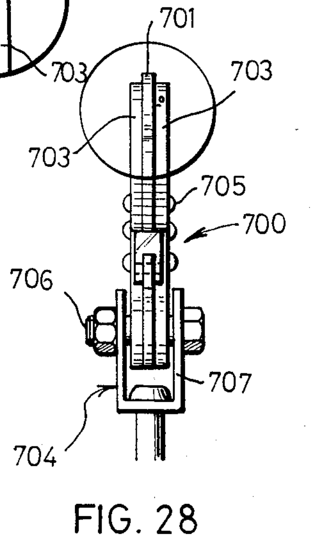
FIG. 28

PULLEY HOISTS

FIELD OF THE INVENTION

The present invention relates to pulley hoists.

BACKGROUND OF THE INVENTION

Pulley hoists are extensively applied as mechanical devices for lifting loads, such as steel girders, and for hauling loads, such as automobiles. While this use is widespread, conventional pulley hoists, of which I am aware, have several drawbacks:

First, the pulley hoists of the prior art are provided with an anchor hook which is suspended by a single "fall" of rope;

Second, the anchor hooks of the prior art are fabricated as two separate parts which increases costs;

Third, the power units of the prior art have a single anchor hook disposed at either end thereof, thereby requiring use of several such power units when certain large objects, such as a steel girder, is being hoisted;

Fourth, pulley hoists of the prior art are devoid of any sort of tension indicators; and Fifth, pulley hoists of the piror art lack adequate safety apparatuses in the event of overloading of the device.

Thus, it will be appreciated that there remains a need for a pulley hoist which solves the above-enumerated disadvantages and deficiencies of the prior art.

SUMMARY OF THE INVENTION

Accordingly, it is the objective of the present invention to alleviate the disadvantages and deficiencies of the prior art by providing pulley hoist arrangements having power units and anchor hooks therefor.

In accordance with the teachings of the present invention, an improved pulley hoist is presented, which includes: (1) a double velocity type hanging hook; (2) a one piece type hanging hook; (3) a multi-piece set type hanging hook.

In further accordance with the teachings of the present invention, a pulley hoist having improved safety features as presented, which include: (1) tensioning indicating and overload safety equipment; (2) overload stoppage apparatus and sound alarm; and (3) apparatuses for presetting and indication of the tension.

These and other objects of the present invention will become apparent from a reading of the following specification taken in conjunction with the enclosed drawings.

BRIEF DESCRIPTION OF THE DRAWINGS

FIG. 23 is a perspective view of still yet another embodiment of a moving anchor hook of the present invention.

FIG. 24 is a side view, in cross-section, of the moving anchor hook of FIG. 23.

FIG. 25 is an end view of the moving anchor hook of FIG. 23.

FIG. 26 is a perspective view of a stationary anchor hook of the present invention having a tension indicator apparatus of the present invention associated therewith.

FIG. 27 is a side view, in partial cross-section, of the stationary anchor hook of the present invention.

FIG. 28 is an end view of the stationary anchor hook of FIG. 26.

FIG. 29 is an enlarged view of a section of the stationary anchor hook of FIG. 28 showing an additional embodiment of tension indicator markings.

DETAILED DESCRIPTION OF THE PREFERRED EMBODIMENTS

Figure 2:
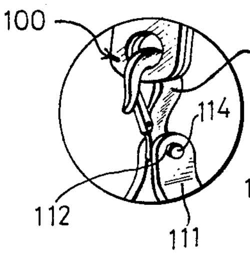
FIG. 2 is an enlarged view relating substantially to FIG. 1 of an alternate means for connecting the moving anchor hook with the power unit.
Figure 1:
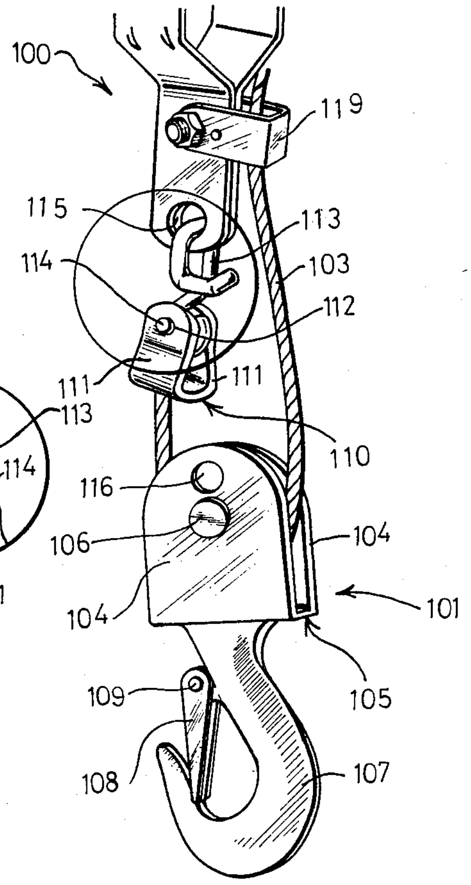
FIG. 1 is a perspective view, of a moving anchor hook and the lower portion of a power unit of the present invention.
Figure 3:
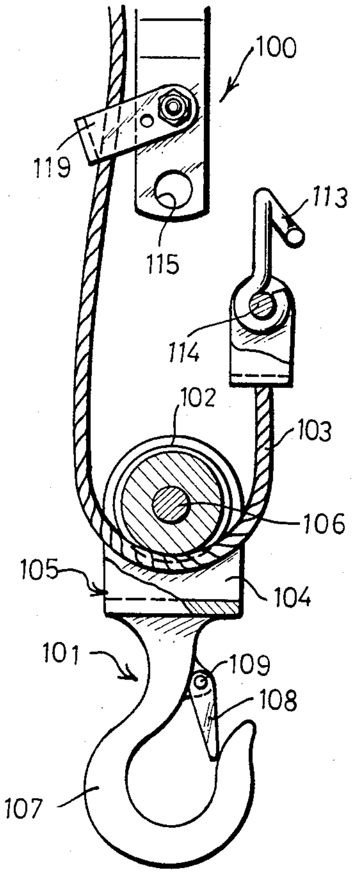
FIG. 3 is a side view of the pulley hoist arrangement of FIG. 1 with part of the bracket of the moving anchor hook broken away and sectioned to show the positioning cable therein.
Figure 4:
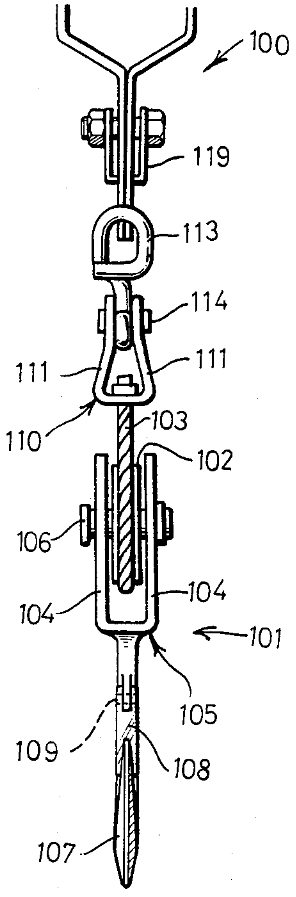
FIG. 4 is an end view of the pulley hoist arrangement relating substantially to FIG. 3.

Referring now to the drawings, there is illustrated the power unit and its associated moving anchor hook which is suspended by two "falls" of rope or cable, each of which enables the load being carried by said moving anchor hook to be raised by the application of a force only half as great as that load. Thus, a mechanical advantage is gained, permitting the object to be carried with only half the force that is required without this advantage.

Figure 13:
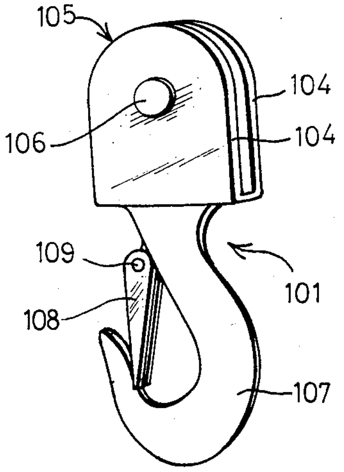
FIG. 13 is a perspective view of the moving anchor hook of FIG. 2.
Figure 14:
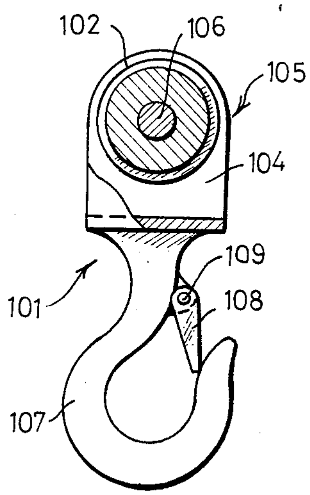
FIG. 14 is a side view of the moving anchor hook of FIG. 2 partially broken away and sectioned to show the sheave.
Figure 15:
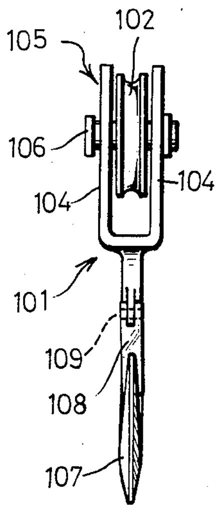
FIG. 15 is an end view of the moving anchor hook of FIG. 13.

As viewed in FIGS. 1–6, there is the lowermost portion of a power unit 100 and a moving anchor hook 101. Extending downwardly and outwardly from the power unit 100 is a cable (rope) 103 which forms a bight. With further reference now to FIGS. 13, 14 and 15, in addition to FIGS. 1–6, positioned in the bight is a sheave 102 which is rotatably mounted between legs 104 of a U-shaped anchor hook bracket 105 on a shaft 106 which interconnects the legs 104 at the one, open end of the bracket 105. What may be considered the second, closed end of the bracket 105 is integrally formed with the closed end of a hook 106. A latch 108 is pivotably mounted to hook 107 on pin 109 over the open end thereof. Mounted thusly, latch 108 pivotably acts to retain the load being carried by the hook 107, thereby preventing accidential dislodgement therefrom.

Figure 5:
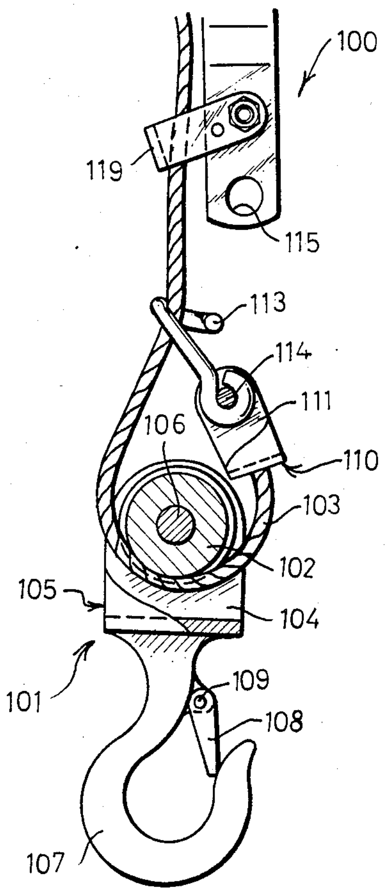
FIG. 5 is another side view of the pulley hoist arrangement of FIG. 1 with part of the bracket of the moving anchor hook broken away and sectioned to show the positioning cable therein and further showing one method of securing the keeper.
Figure 6:
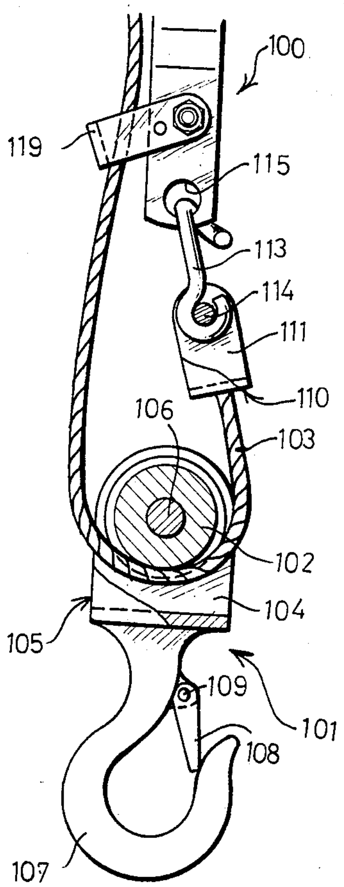
FIG. 6 relates substantially to FIG. 5 showing another method of securing the keeper during use thereof.
Figure 7:
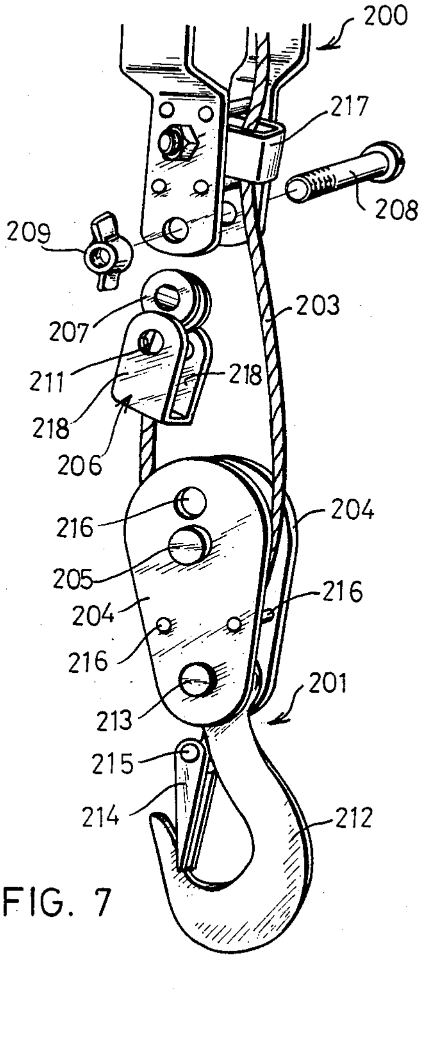
FIG. 7 is a perspective view of another moving anchor hook and the lower portion of a power unit of the present invention having the keeper thereof exploded for the sake of clarity.
Figure 8:
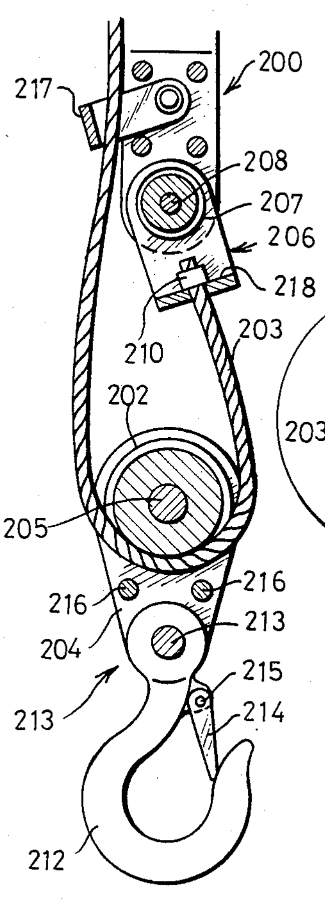
FIG. 8 is a side view of the pulley hoist arrangement of FIG. 7 with the moving anchor hook in cross-section to show positioning of the cable therein.

Returning now to FIGS. 1–6 exclusively, one end of the cable 103 is extended from the power unit 100 through a pivotably mounted guide bracket 109. The second, opposite end of cable 103 is anchored within the closed end of a keeper bracket 110. At what may be considered the closed end of keeper bracket 110, the legs 111 of said bracket 110 are each provided having a pair of substantially aligned apertures 112 formed therein. Received through apertures 112 is the closed end of a keeper 113. Keeper 113 is pivotably secured in keeper bracket 110 by a conventionally and transversely installed pin 114. Referring now to FIGS. 1 and 3–6, the opposite (open) end of keeper 113 is twisted back upon itself in the direction of the closed end of the keeper 113 and then traversely thereto, such that a hooking portion is formed. This hooking portion may then be received through either an aperture 115 formed in the frame of the lowermost portion of the power unit 100 (FIGS. 1, 4 and 6) or said hooking portion may be received over that portion of the cable 103 which extends downwardly from the power unit 100 (FIG. 5). The former position of the keeper 113, wherein it is disposed through the aperture 115, is especially useful where a heavier load is being carried at a low speed. The latter position of the keeper 113, wherein it is disposed over the cable 103, is especially useful where a lighter load is being carried at a higher speed. In either position, it is in this manner that the second, opposite end of cable 103 may be anchored during use of the apparatus.

Alternatively, keeper 113 may be formed as a hook (FIG. 2). In this event, the closed end of the hook is received between the legs 111 of keeper bracket 110, wherein a conventional and transversely installed pin 114 provides a pivotable connection therebetween. Like hook 107, the hook of this keeper has a latch which is pivotably mounted thereto on a pin. Mounted thusly, said latch pivotably acts to retain this keeper in place when installed, for example, in the aperture 115 of the power unit 100, thereby preventing accidental dislodgement therefrom.

With reference now to FIGS. 7–12, extending downwardly and outwardly from power unit 200 is a cable (rope) 203 which forms a bight. Positioned within the bight is a sheave 202 of a moving two-piece anchor hook 201. Sheave 202 is rotatably mounted between side plates 204 on a pin 205 which interconnects plates 204 at one end thereof. At what may be considered the other end, plates 204 receive the closed end of a hook 212 on a conventionally and transversely installed pin 213 providing a pivotable connection therebetween. A latch 214 is pivotably mounted to hook 212 on pin 215 over the open end thereof. Mounted thusly, latch 214 pivotably acts to retain the load being carried by the hook 212, thereby preventing accidental dislodgement therefrom. Finally, pins 216 are transversely mounted between plates 204 interconnecting said plates 204, thereby lending additional structural support thereto.

One end of the cable 203 is extended from the power unit 200 through a pivotably mounted guide bracket 217. The second, opposite end of cable 203 is anchored within the closed end of a U-shaped keeper bracket 206 at the closed end thereof by a solderless terminal 210 or any other suitable means. At what may be considered as the other open end of bracket 206, each of the legs 218 thereof has an aperture 211 formed therein. Said apertures 211 are formed so as to be substantially aligned with one another on a traverse axis. If desired, a roller wheel (sheave) 207, having a concave perimeter surface is received between legs 218 and is rotatably mounted therein by threading engagement between shaft 208 and wing nut 209 (FIGS. 7, 8, 9 and 10). In this fashion, shaft 208 also interconnects legs 218, thereby lending additional structural support thereto.

Figure 11:
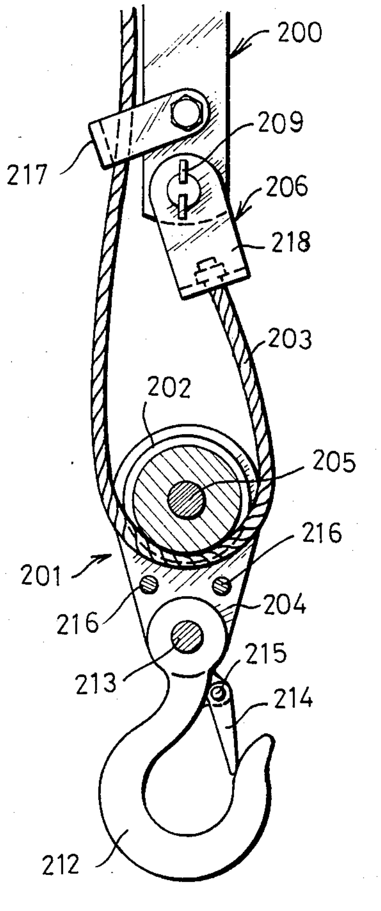
FIG. 11 is another side view corresponding substantially to FIG. 8.
Figure 12:
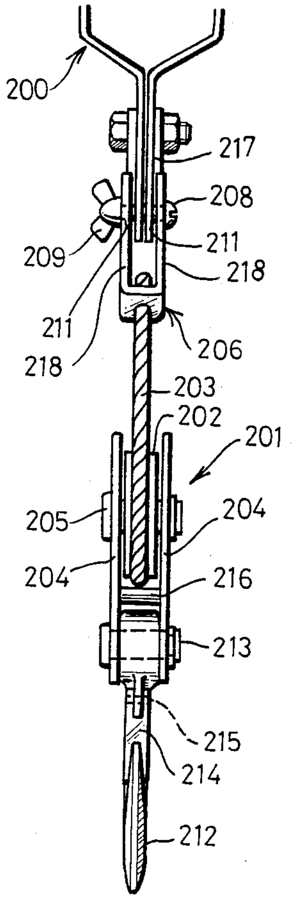
FIG. 12 is another end view of the pulley hoist of FIG. 8.

If desired, the roller (sheave) wheel may be eliminated (FIGS. 11 and 12).

Figure 9:
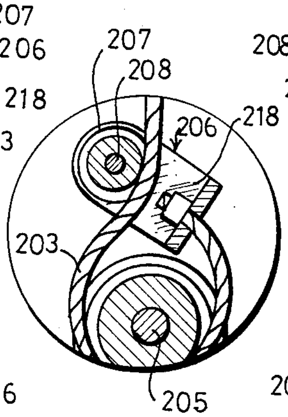
FIG. 9 is an enlarged view of a section of the pulley hoist of FIG. 7 showing another method of securing the keeper.
Figure 10:
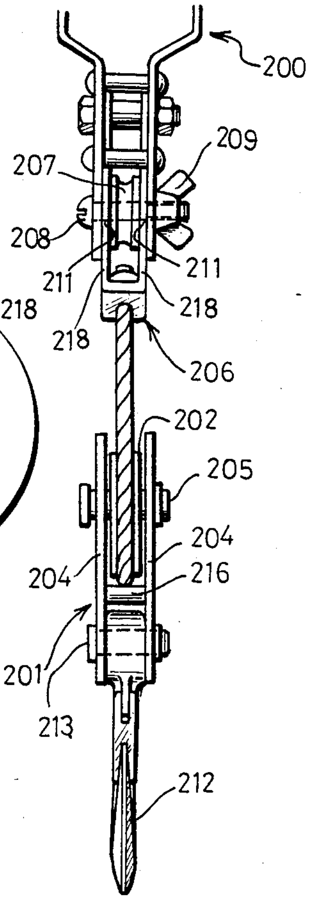
FIG. 10 is an end view of the pulley hoist of FIG. 8.

The keeper bracket 206 may, alternatively, be secured directly to the power unit 200 by shaft 208 (FIGS. 7, 8, 10, 11 and 12) or said keeper bracket 208 may be disposed over that portion of the cable 203 which extends downwardly from the power unit 200 (FIG. 9). The former position of the keeper bracket 208, wherein it is secured directly to the power unit 200, is especially useful where a heavier load is being carried at a slow speed. The latter position of the keeper bracket 208, wherein it is disposed over the cable 203, is especially useful where a lighter load is being carried at a higher speed. In either position, it is in this manner that the second, opposite end of cable 203 may be anchored during use of the apparatus.

Figure 16:
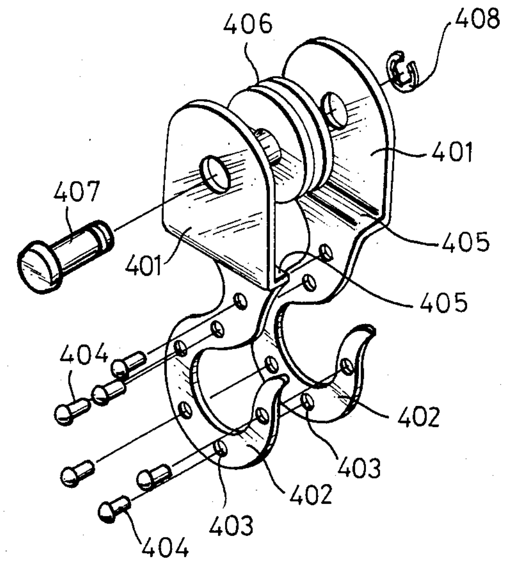
FIG. 16 is an exploded view, in perspective, of another embodiment of a moving anchor hook of the present invention.
Figure 17:
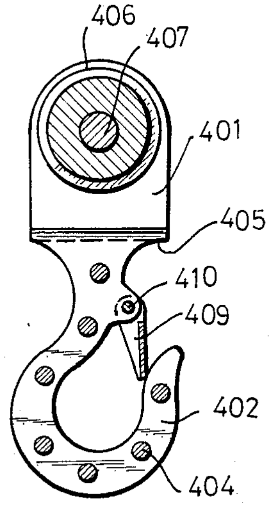
FIG. 17 is a side view, in cross-section, of the moving anchor hook of FIG. 16.
Figure 18:
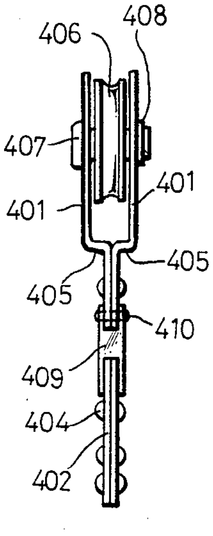
FIG. 18 is an end view of the moving anchor hook of FIG. 16.

With reference now to FIGS. 16, 17 and 18, an alternate embodiment of a moving anchor hook 400 is illustrated, wherein the side plates 401 are integral with the hook 402. The sheave 406 is rotatably mounted between plates 401 on a shaft 407 at one end thereof. Shaft 407 is suitably secured in place by washer 408. At what may be considered the other, opposite end of each of plates 401, integrally formed therewith, is an inwardly oriented ledge (shoulder) 405. Integrally formed with each of the ledges 409, and extending downwardly therefrom, is the closed end of a hook 402. Each of said hooks 402 is provided having a plurality of apertures 403 formed therein, the apertures 403 of one hook 402 being in substantial traverse axial alignment with the apertures 403 of the other hook 402. Received transversely through each of said apertures 403 is a conventional pin 404, whereby said hooks 402 are suitable secured together. Due to the shoulders 405, when hooks 402 are so secured, there is adequate clearance between the side plates 401 to receive the sheave 406 therebetween.

If desired, a latch 409 may be pivotably mounted on pin 410 to said hooks 402 so that said latch 409 is positioned over the open end thereof. Once again, latch 409 pivotably acts to retain the load being carried by the hook 402, thereby preventing accidental dislodgement therefrom.

Figure 20:
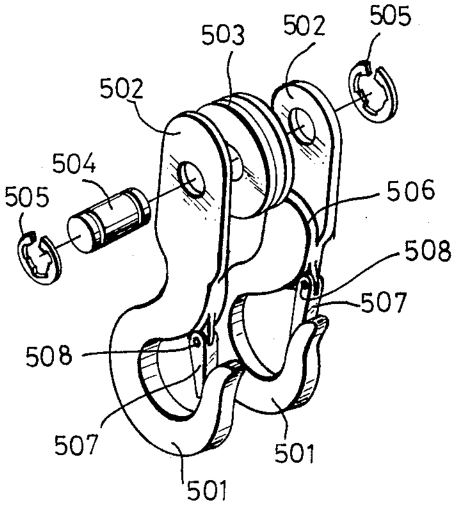
FIG. 20 is an exploded view, in perspective, of still another embodiment of a moving anchor hook of the present invention.
Figure 21:
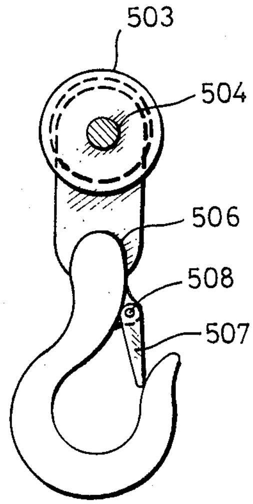
FIG. 21 is a side view, in cross-section, of the moving anchor hook of FIG. 20.
Figure 22:
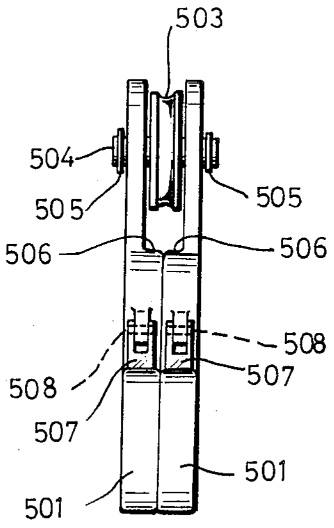
FIG. 22 is an end view of the moving anchor hook of FIG. 20.
Figure 30:
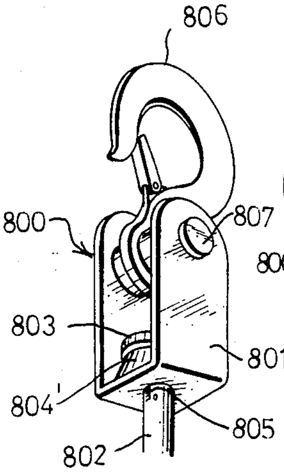
FIG. 30 is a perspective view of a stationary anchor hook of the present invention having another tension indicator apparatus associated therewith.

Referring now to FIGS. 20-22, another alternative embodiment of a moving anchor hook 500 is illustrated, wherein the side plates 502 and the hook 501 are formed as a single unitary element defining an inwardly oriented shoulder 506 therebetween. The sheave 503 is rotatably mounted between side plates 502 on a pin 504 at one end thereof. Pin 504 is suitably secured in place by a pair of washers 505, one of which is positioned in a respective groove formed at both ends of said pin 504. At what may be considered the other end of each of said plates 502, a hook 501 is integrally formed therewith, as aforesaid. Due to shoulders 506, when the anchor hook is secured together, there is adequate clearance between the side plates 502 to receive the sheave 503 therebetween.

As will be understood by those skilled in the art, if desired, sheave 503 can be formed of a size so that it is received entirely between the side plates 502 (FIGS. 20 and 22) or it may be formed having a larger diameter, wherein it extends substantially radially from said side plates 502 (FIG. 21).

Finally, each of said hooks 501 may have a latch 507 being pivotably mounted on pin 508 so that each of said latch 507 is positioned over the open end thereof. Positioned thusly, each of said latches 507 pivotably acts to retain therein the load being carried by the respective hook 501, thereby preventing accidental dislodgement therefrom.

It will be understood by those skilled in the art that the moving anchor hooks illustrated in FIGS. 20-22 are formed so that each of the hooks 501 and its associated side plate 502 may pivot about pin 504 independently of each other.

With reference now to FIGS. 23-25 still another alternative embodiment of a moving anchor hook 600 is illustrated, wherein the hooks 605 thereof may pivot about a shaft 606 independently of one another. Each moving anchor hook 600 is provided with a sheave 602 which is rotatably mounted between a pair of side plates 601 on a pin 603 which interconnects said plates 601 at one end thereof. A washer 604 suitably secures pin 603 in place. At what may be considered the other end, plates 601 receive the closed end of each one of a pair of hooks 605. Hooks 605 are therein positioned on a conventionally and transversely installed shaft 606, providing a pivotal connection therebetween. If desired, a respective latch 607 is pivotably mounted to a respective hook 605 on a respective pin 608 over the respective open end thereof (FIGS. 24 and 25). Mounted thusly, latches 607 pivotably act to retain the load being carried on the respective hook 605, thereby preventing accidental dislodgement therefrom. Returning now to FIGS. 23-25, pins 609 are traversely mounted between plates 601 so as to interconnect said plates 601, thereby lending additional structural support thereto.

It will be understood by those skilled in the art that the moving anchor hooks 600 illustrated in FIGS. 23-25 are formed so that each of the said hooks 605 thereof may pivot about the shaft 606 independently of each other.

Figure 19:
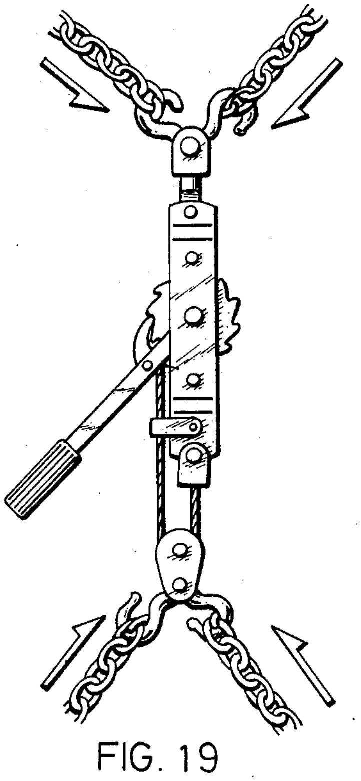
FIG. 19 is a perspective view of the pulley hoist of the present invention having the moving anchor hooks of FIGS. 23–25.

With reference now to FIG. 19, there is illustrated the moving anchor hooks 600 of FIGS. 23-25 being utilized in conjunction with a power unit, wherein the said anchor hooks are pivoted independently of each other. With this arrangement, the apparatus of the present invention can be utilized for the lifting of large objects such as steel girders. With the application of the moving anchor hooks of FIGS. 23-25 (and 20-22) the stress created by such a large object can be spread over four different directions as illustrated in FIG. 19. This not only reduces the stress placed upon any single anchor hook, but also eliminates the necessity of using two or more sets of pulley hoists in order to lift such a load.

With reference now to FIGS. 26-29, there is illustrated a stationary anchor hook 700 which is hooked upon any suitable means and which supports the power unit. In that these stationary anchor hooks 700 carry the power unit, in addition to the moving anchor hook and the load it carries, said stationary anchor hook 700 is the part of the apparatus which is subjected to the greatest tension. Hence, said anchor hooks 700 are provided with tension indicator apparatusus built therein. The upper end of the power unit (not shown) is suitably secured to one end of shaft 702. The second, opposite end of shaft 702 is suitably secured to a bifurcated connector element 704 having side walls 707. At what may be considered the other end thereof, side walls 707 receive the closed end of each one of a pair of hooks 703 providing a pivotal connection therebetween. Positioned between said hooks 703, and pivotably mounted on shaft 706 is a tension indicator hook 701 having a tension readout plate 708 formed on substantially the open end thereof. Hook 701 is fabricated from a pliant, substantially-resilient material. The curved portion of hook 701 is formed so as to be less convex than the curved portion of hooks 703. In this respect, the tension indicator hook 701 projects inwardly from between the hooks 703. Hooks 701 and 703 are all suitably secured together by bolts 705 disposed through said hooks 701 and 703 substantially near the closed end thereof. Readout plate, and that portion of the hooks 703 adjacent thereto, are provided with a tension scale readout. Formed thusly, when hooks 701 and 703 carry an object (or are used to support the power unit) the said object is received in the curved portion of said hooks 701 and 703. There the object being carried contacts first the inwardly projecting portion of hook 701. With its closed end secure in place by the bolts 705, the force created by the object being carried forces the open end of the hook 701 outwardly, thereby also moving plate 708, having scale 709 thereon, outwardly. The addition of weight upon the moving anchor hook of the apparatus creates an additional force which causes greater outward deformation of the hook 701 which, in turn, carries the moving plate 708 having the scale 709 thereon outwardly. Outward deformation of the hook 701 is limited by the positioning of hooks 703. When weight is removed or the force is otherwise removed from the apparatus, the hook 701 resiliently returns towards its original positioning. In this manner, a scaled readout is provided of the tension being placed upon said stationary anchor hook.

Figure 32:
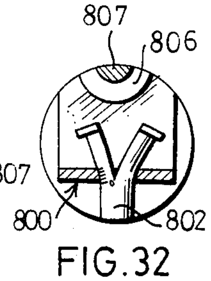
FIG. 32 is a partial view of a stationary anchor hook enlarged for the sake of clarity showing an alternate embodiment of the tension indicator apparatus.
Figure 31:
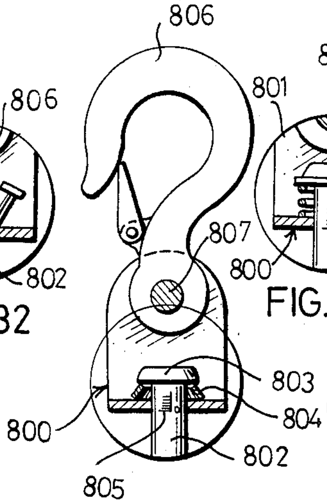
FIG. 31 is a side view, in cross-section, of the stationary anchor hook of FIG. 30 and its associated tension indicator apparatus.
Figure 33:
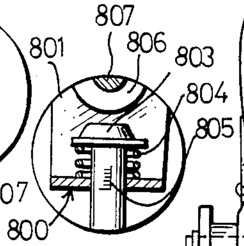
FIG. 33 is a partial view of a stationary anchor hook enlarged for the sake of clarity showing another alternate embodiment of the tension indicator apparatus.
Figure 34:
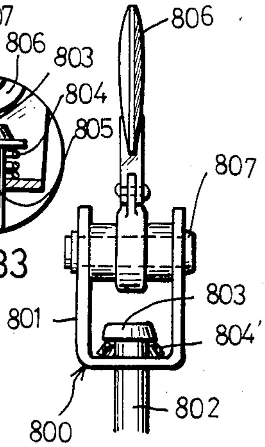
FIG. 34 is an end view of the stationary anchor hook of FIG. 31.

With reference now to FIGS. 30-34, another embodiment of the tension indicator apparatus is illustrated, wherein the tension scale readout 805 is carried by the shaft 802. In this embodiment, upper end of the power unit (not shown) is suitably secured to the one end of shaft 802. The second, opposite end of shaft 802 is received in a bifurcated connector element 800 having side walls 801. At what may be considered the other end thereof, side walls 801 receive the closed end of a hook 806 on a conventionally and transversely installed bolt shaft 807, thereby providing a pivotal connection therebetween. Shaft 802 is resiliently biased within said element 800, so that said element is constantly being urged in a direction being substantially towards the hook 806. Various means 804 may be provided for producing such biasing action and to constantly urge the second end of the shaft in an upwardly direction. For example, a ball-type disc spring 804 (FIG. 30) may be employed. A pair of spring arms 804 (FIGS. 31 and 34) or a resilient coil spring (FIG. 33) may alternatively be employed. If desired, the second end of the shaft may be split, whereby two legs are formed, each of said legs being biased outwardly (FIG. 32). Force overcoming this biasing action would move the legs of the shaft towards one another thereby permitting downward movement of the shaft 802 in the element 800. Downward movement of the shaft 802 is limited by cap element 803 being disposed on the top of the second end of shaft 802.

Figure 35:
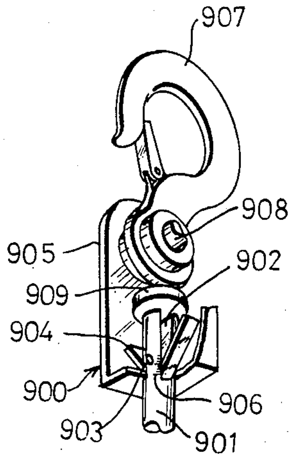
FIG. 35 is a perspective view of a stationary anchor hook of the present invention with part of the bracket thereof broken away, and sectioned to show still another embodiment of an associated tension indicator apparatus.
Figure 36:
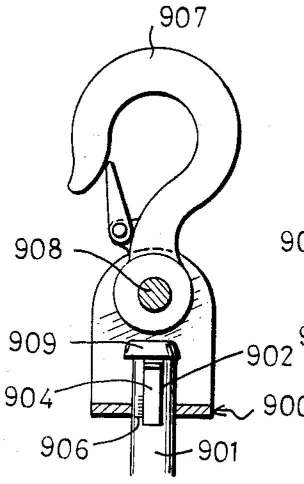
FIG. 36 is a side view, in cross-section, of the stationary anchor hook of FIG. 35 and its associated tension indicator apparatus.
Figure 37:
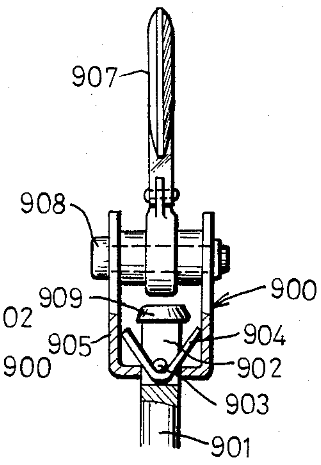
FIG. 37 is an end view of the stationary anchor hook of FIG. 35 with part of the bracket and shaft thereof broken away and sectioned to further show the associated tension indicator apparatus.

Additional biasing means are illustrated in FIGS. 35-37, wherein the tension readout scale 906 is carried on shaft 901. In this embodiment, the upper end of the power unit (not shown) is suitably secured to the one end of shaft 901. The second opposite end of shaft 901 is received in a bifurcated connector element 900 having side walls 905. The other end of element 900 carries the closed end of an a hook 907 on a conventionally and transversely installed bolt shaft 908, thereby providing a pivotal connection therebetween. Shaft 901 is provided having an elongated slot 902 formed therein. Disposed through said slot 902 is a substantially V-shaped spring arm unit 904 having its two arms extending outwardly therefrom. A ball-detent 903 is disposed in the slot 902 substantially within the recess formed between the two arms of unit 904.

Spring arms of unit 904 are resiliently-biased in a direction away from one another and they engage the element 900, thereby preventing unrestrained downward movement of the shaft 901 in the element 900. The force created by an object being carried by the moving anchor hook (not shown) creates a force which overcomes the brasing action of the arms of unit 904, forcing said arms toward one another and allowing the shaft 901, having the scale 906 thereon, to move downwardly away from anchor hook 907, thereby producing a tension reading on scale 906. Downward movement of the shaft 901 is limited by a cap element 904 disposed on the top of the second end of shaft 901.

Figure 38:
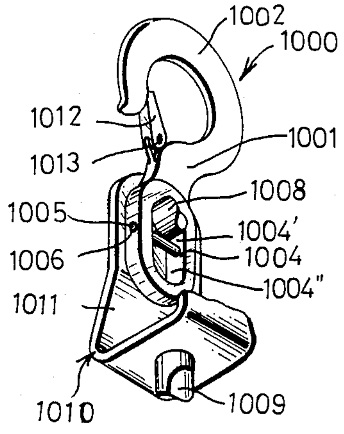
FIG. 38 is a perspective view of another stationary anchor hook partially broken away and sectioned to show an associated tension overload safety feature.
Figure 39:
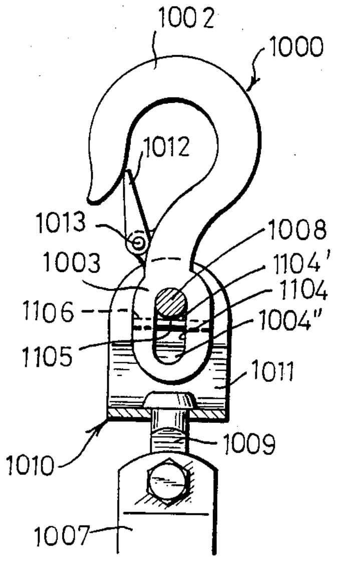
FIG. 39 is a side view, in cross-section, of the stationary anchor hook of FIG. 38.
Figure 40:
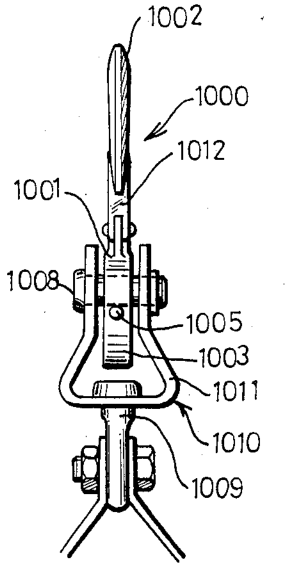
FIG. 40 is an end view of the stationary anchor hook of FIG. 38.
Figure 41:
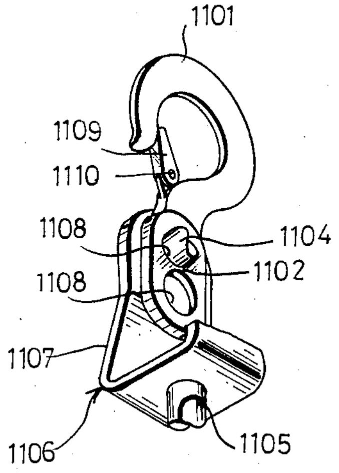
FIG. 41 is a perspective view of another stationary anchor hook partially broken away and sectioned to clearly show another embodiment of an associated tension overload safety feature.
Figure 42:
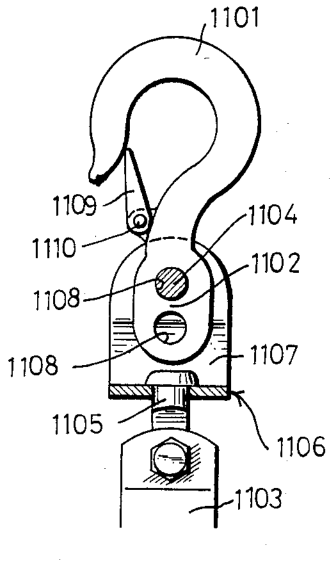
FIG. 42 is a side view, in cross-section, of the stationary anchor hook of FIG. 41.
Figure 43:
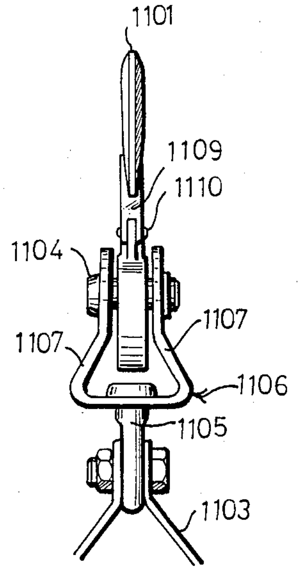
FIG. 43 is an end view of the stationary anchor hook of FIG. 41.
Figure 45:
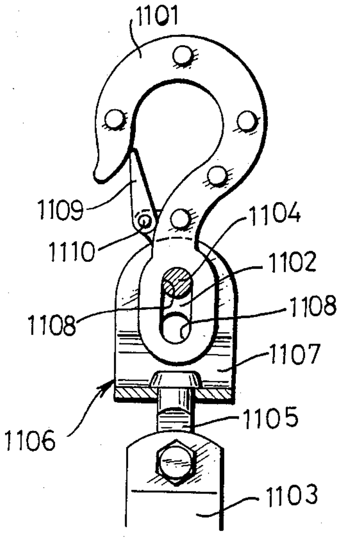
FIG. 45 is a side view, in cross-section, of the stationary anchor hook, and its associated tension overload safety feature of FIG. 44.
Figure 44:
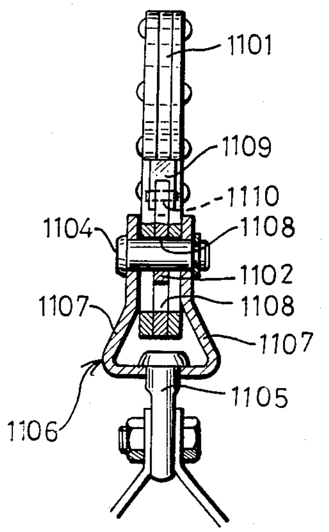
FIG. 44 is an end view of another stationary anchor hook, partially sectioned to show another embodiment of an associated tension overload safety feature.

With reference now to FIGS. 38-40, there is illustrated a stationary hook 1000 suitably secured to the end of power unit 1007, said anchor hook 1000 having a safety apparatus in the event of overloading of the device. The upper end of power unit 1007 is suitably secured to one end of shaft 1009. The second, opposite end of shaft 1009 (connector shaft) has an enlarged portion formed thereon. A connector element 1010 is provided having a top wall and a pair of side walls 1011 extending upwardly from opposite sides of the top wall. Top wall further has an aperture formed therein. Said aperture is of a diameter being smaller than that of the enlarged portion of the shaft 1009. The second end of shaft 1009 is suitably secured to the bifurcated connector element 1010 having side walls 1011 by being received through the aperture of the top wall, so that the enlarged portion abuts the upperside of the top wall of the connector element 1010. In this fashion, the shaft 1009 permits the anchor hook to support the power unit 1007 by the connector element 1010 and further permits the hook to be rotated a full 360°, so that it may be set at any radial angle relative to the longitudinal axis of the shaft 1009. The closed end of 1003 of hook 1001 is provided having an elongated slot 1004 formed through the closed end 1003 thereof. At substantially equidistantly between either end of said slot 1004, a pair of substantially aligned apertures 1006 are formed in the walls of the closed end of said hook 1001. Received through said apertures 1006 is a pin 1005. Said pin 1005 divides slot 1004 into an upper portion 1004' and a lower portion 1004''.

The hook 1001 has a open hooking portion 1002 and a closed end 1003. The closed end 1003 of hook 1001 is received between the side walls 1011. Received thusly, hook 1001 is pivotably secured therein by a conventional and transversely installed bolt shaft 1008 which is received through either slot 1004' or 1004" each of which are formed as aforesaid in the closed end 1003 of the hook 1001 providing a pivotal connection therebetween. It should be noted that the longitudinal axis of bolt shaft 1008 and the longitudinal axis of pin 1005 are substantially perpendicular to one another.

Said hook 1001 further has a latch 1012 being pivotably mounted on pin 1013 so that said latch 1012 is positioned over the open end of said hook 1001, thereby preventing accidental dislodgement therefrom.

With further reference now to FIGS. 41-45 another embodiment of the safety apparatus and its associated stationary anchor hook is now illustrated. The upper end of power unit 1103 is suitably secured to one end of shaft 1105. The second opposite end of shaft 1105 (connector shaft) has an enlarged portion formed thereon. A connector element 1106 is provided having a top wall and a pair of side walls 1107 extending upwardly from opposite sides of the top wall. Top wall further has an aperture formed therein. Said aperture is of a diameter being smaller than that of the enlarged portion of the shaft 1105. The second end of shaft 1105 is suitably secured to the bifurcated connector element 1106 having side walls 1107 by being received through the aperture of the top wall, so that the enlarged portion abuts the upperside of the top wall of the connector element 1106. In this fashion, the shaft 1105 permits the anchor hook to support the power unit 1103 by the connector element 1106 and further permits the hook to be rotated a full 360°, so that it may be set at any radial angle relative to the longitudinal axis of the shaft 1105. The closed end of hook 1101 is provided having a pair of transversely oriented apertures 1108 formed therein. Separating said apertures 1108 from one another is a strip structure 1102 which is integral with the closed end of the hook 1101. The closed end of hook 1101 having apertures 1108 formed therein, is received between the side walls 1107. Received thusly, hook 1101 is secured therein by a conventional and transversely installed bolt shaft 1104, which is received through either of said apertures 1108 formed in the closed end of hook 1101, thereby providing a pivotal connection therebetween.

Said hook 1101 further has a latch 1109 being mounted thereon for pivotable movement about pin 1110, so that said latch 1109 is positioned over the open end of said hook 1101, thereby preventing accidental dislodgement therefrom.

Figure 47:
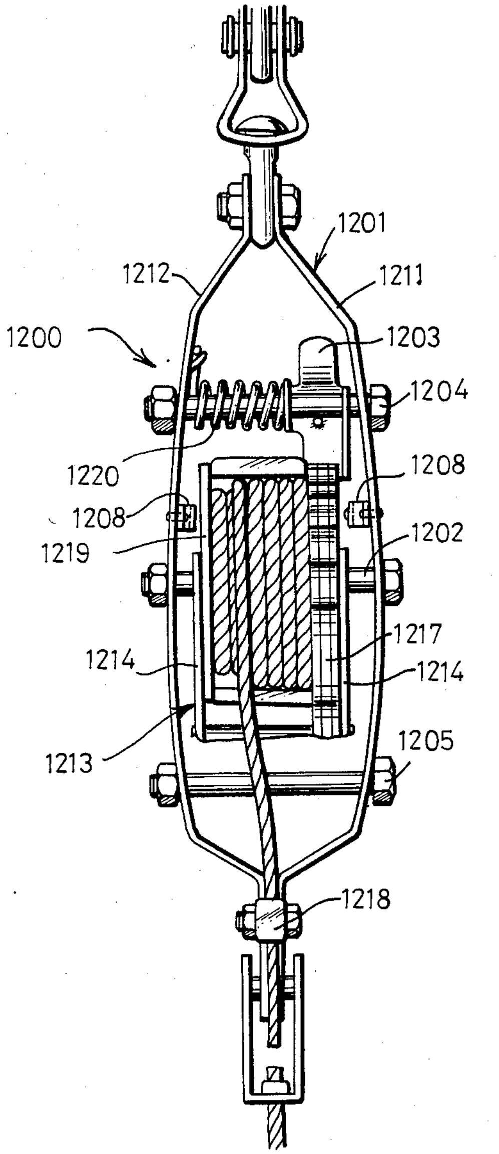
FIG. 47 is an end view of the power unit of FIG. 46.
Figure 48:
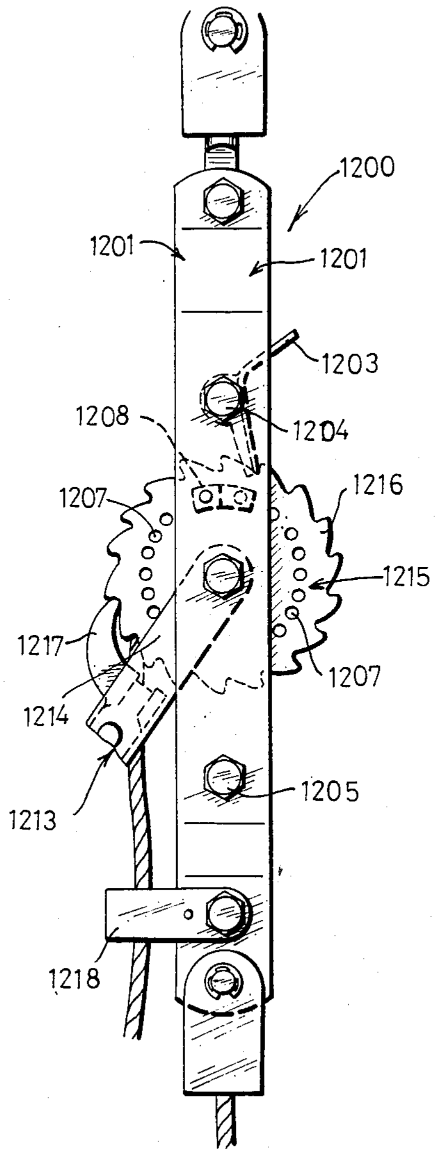
FIG. 48 is a side view of the power unit of FIG. 46.
Figure 49:
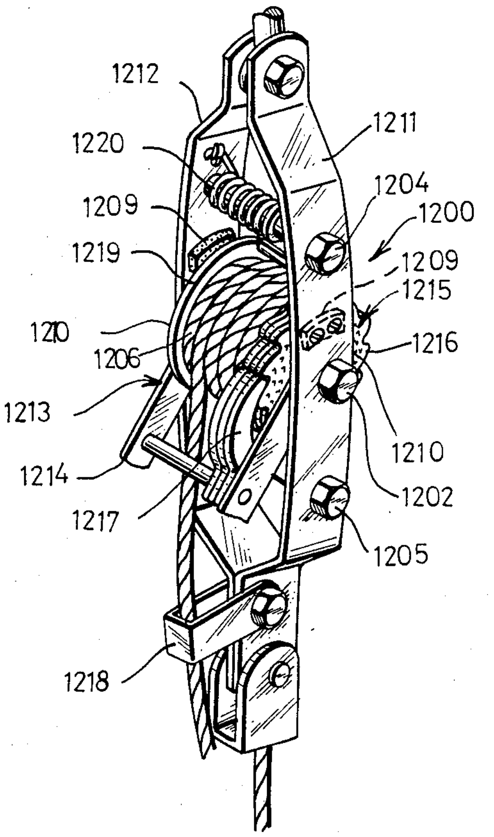
FIG. 49 is a perspective view of a power unit having the tension overload gripping feature of the present invention.
Figure 50:
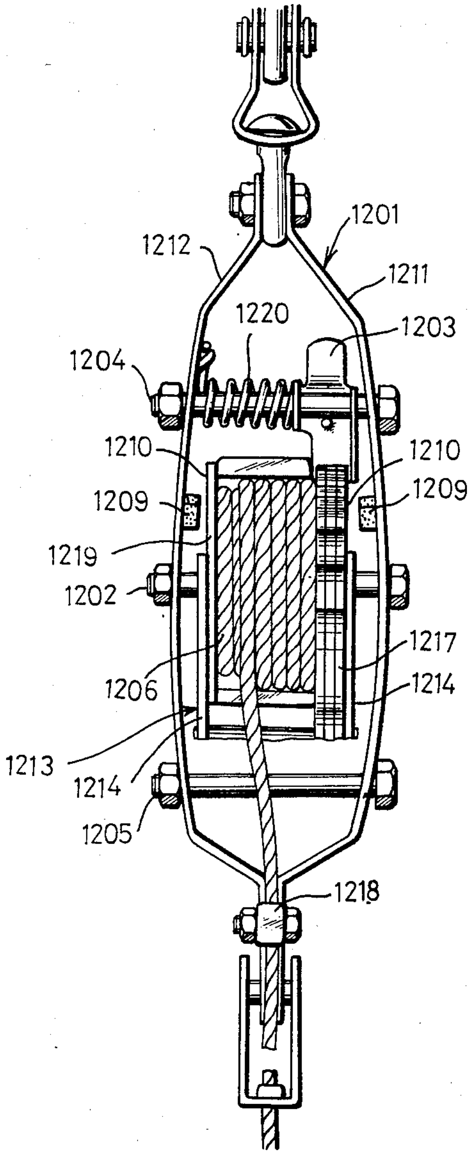
FIG. 50 is an end view of the power unit of FIG. 49.
Figure 51:
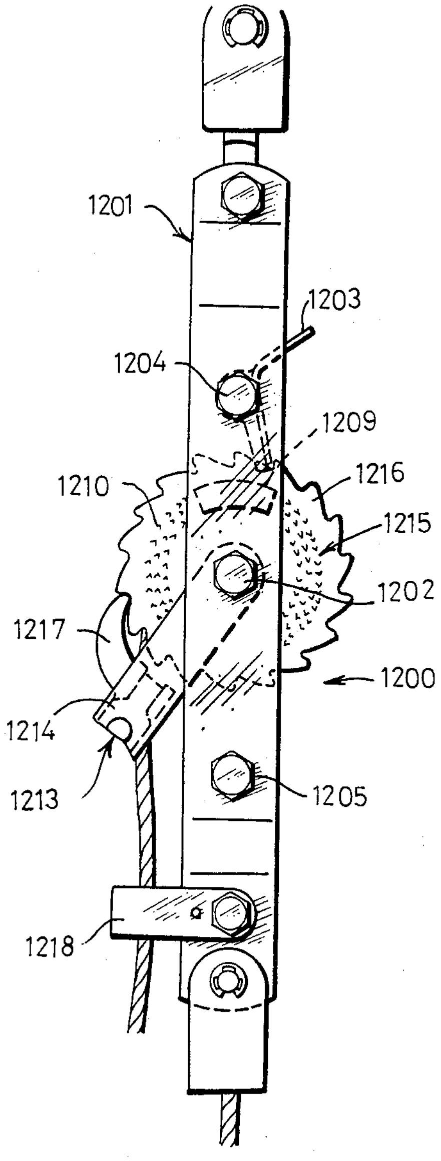
FIG. 51 is a side view of the power unit of FIG. 49.

Referring now to FIGS. 46-51 there is illustrated a power unit 1200 of the present invention equipped, alternatively, with a alarm safety feature which sounds in the event of deformation of the power unit 1200 due to the overload thereof (FIGS. 46, 47 and 48) or with a frictional gripping feature to prevent the unrestrained rotation of the pulley wheel of the power unit in the event of deformation of the power unit 1200 due to the overload thereof (FIGS. 49, 50 and 51). The power unit 1200, to which the safety features are incorporated, is a traditional one including a rigid frame 1201 having spaced, substantially parallel arms 1211 and 1212. Carried by one end of frame 1201 is a moving anchor hook and carried by the other, opposite end is a stationary anchor hook.

A swingable operating handle or lever 1213 includes spaced arm extensions 1214 which are pivotably mounted at substantially the longitudinal centers of arms 1211 and 1212. Said arms 1214 are engaged inwardly of the arms 1211 and 1212 and are pivotably fixed thereon by transverse bolt 1202. A pulley wheel member (including a buckthorn toothed wheel) 1215 is rotatably mounted between arms 1211 and 1212 on the transverse axis of transverse bolt 1202. Pulley wheel member 1215 includes ratchet teeth 1216 which are disposed on one side thereof for co-action with a feed pawl (drive block) 1217 and a holding pawl 1203, which is mounted between arms 1211 and 1212 on the transverse axis of transverse bolt 1204. A guide bracket 1218 is fixedly mounted on frame 1201 to direct the rope (cable) 1206 onto the rotatable drum 1219 of pulley wheel member 1215.

Driving or feed pawl 1217 is pivotably mounted between arms 1214 and is positioned for co-action with the ratchet teeth 1216 as shown. An activating mechanism (not shown) is mounted on the frame 1201 and is used to render the feed pawl 1217 active and inactive with respect to the ratchet teeth 1216. Further the activating mechanism facilitates co-action between the feed pawl 1217 and the holding pawl 1203 during the step-by-step retrograde movement of the pulley wheel member 1215.

The holding pawl 1203 is rotatably mounted between arms 1211 and 1212 and is positioned for co-action with the ratchet teeth 1216 as shown, the holding pawl 1203 is biased towards engagement with the ratchet teeth 1216 by the torsional spring 1220.

A transversal support bolt 1205 is secured between arms 1211 and 1212, thereby lending additional structural support thereto.

Figure 46:
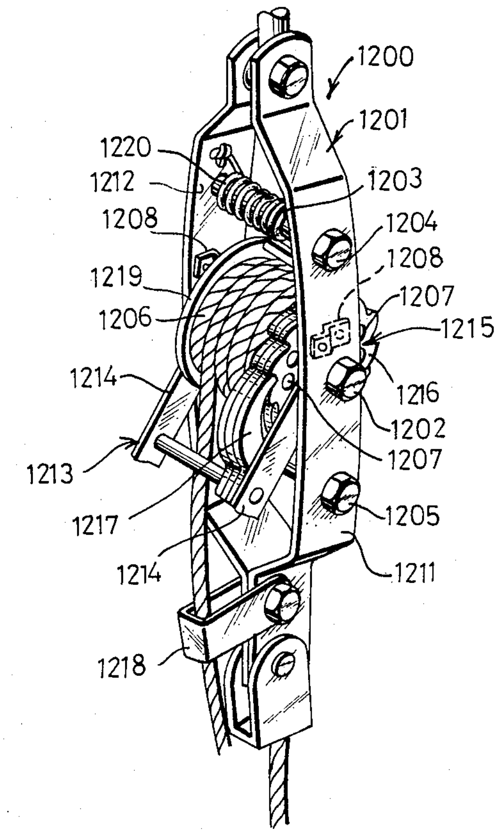
FIG. 46 is a perspective view of a power unit having the alarm safety feature of the present invention.

Referring now exclusively to FIGS. 46, 47 and 48, an alarm safety feature is provided which sounds in the event of the deformation of the power unit 1200 due to the overload thereof. Said sound alarm is comprised of a plurality of depressions 1207 circumferentially formed substantially near the perimeter of the pulley wheel member 1215. A bell-alarm means 1208 is secured to the inside of arms 1211 and 1212 to co-act with the depressions 1207 in the event of deformation of the unit. When deformation due to overload occurs, the arms 1211 and 1212 become deformed, thereby bringing the bell means 1208 into physical contact with the depressions 1207 which sounds the alarm, thereby warning the operator thereof of said deformation.

Referring now exclusively to FIGS. 49, 50 and 51, another frictional gripping safety feature is provided which grips the pulley wheel member 1215, thereby preventing the unrestrained rotational movement in the event of deformation of the power unit 1200 due to overload thereof. Said gripping safety feature is comprised of forming the side faces of the pulley wheel member 1215 with a friction stoppage face 1210. A friction pad 1209 is positioned to the inside of arms 1211 and 1212 to co-act with the faces 1210 in the event of deformation of the unit. When deformation due to overload occurs, the arms 1211 and 1212 become deformed, thereby bringing pads 1209 into physical frictional contact with faces 1210. This frictional contact acts to frictionally prevent unrestrained rotational movement of the pulley wheel member 1215 in the event of overload thereof.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. A anchor hook for a pulley hoist having a power unit, in combination, comprising:

a bifurcated connector element including a top wall having a pair of upwardly-extending side walls, said top wall further having an aperture formed therein;

a connector shaft having a longitudinal axis, a one end being secured to the power unit and a second end including an enlarged portion formed thereon;

a hook including a closed end and an open hooking portion, said closed end having a pair of transverse slots formed therethrough said slots being substantially aligned with each other, each on an axis being transverse to the hook, and defining a shear strip portion therebetween said closed end being received between the side walls of the connector element;

a bolt shaft carried by each upwardly-extending sidewall and extending through the slot for suitably, pivotably securing the closed end of the hook between the side walls;

a latch positioned on the open hooking portion of the anchor hook, said latch having a first open position wherein the latch is oriented in a direction away from the hooking portion, whereby the hook may be loaded and unloaded and a second closed position, wherein the latch is oriented in a direction towards and communicates with the hooking portion such that said latch is positioned over the open hooking portion, whereby the anchor hook is prevented from being accidently dislodged; and means for pivotably securing the latch for pivotal movement between the first open position and the second closed position, said connector shaft being received through the aperture of the top wall of the connector element with the enlarged portion of the shaft abutting the top wall, providing support between the anchor hook and the power unit and permitting 360° rotation of the shaft in the aperture so that the hook may be oriented at any radial angle relative to the longitudinal axis of the connector shaft.

* * * * *